(12) United States Patent
Cruz et al.

(10) Patent No.: US 12,043,160 B2
(45) Date of Patent: Jul. 23, 2024

(54) TEMPERATURE-CONTROLLED RECEIVING TUNNEL

(71) Applicant: Walmart Apollo, LLC, Bentonville, AR (US)

(72) Inventors: Jeffrey Scott Cruz, Bentonville, AR (US); Brandon Joel Easterling, Bella Vista, AR (US); Jeremy L. Velten, Bella Vista, AR (US)

(73) Assignee: Walmart Apollo, LLC, Bentonville, AR (US)

(*) Notice: Subject to any disclaimer, the term of this patent is extended or adjusted under 35 U.S.C. 154(b) by 20 days.

(21) Appl. No.: 18/157,826

(22) Filed: Jan. 21, 2023

(65) Prior Publication Data
US 2023/0166909 A1  Jun. 1, 2023

Related U.S. Application Data

(63) Continuation of application No. 17/034,342, filed on Sep. 28, 2020, now abandoned.
(Continued)

(51) Int. Cl.
*B60P 3/20* (2006.01)
*B65G 1/04* (2006.01)
(Continued)

(52) U.S. Cl.
CPC ............ *B60P 3/20* (2013.01); *B60P 3/205* (2013.01); *B65G 1/0485* (2013.01);
(Continued)

(58) Field of Classification Search
CPC .......... B60P 3/20; B60P 3/205; B65G 1/0485; B65G 69/006; B65G 69/008;
(Continued)

(56) References Cited

U.S. PATENT DOCUMENTS 5,054,295 A * 10/1991 Goulooze ............ B60H 1/3232
410/127
6,305,128 B1 * 10/2001 Horner .................... B60P 3/205
160/40

(Continued)

OTHER PUBLICATIONS

Unknown, "DLE 61 temperature controlled tunnel through-loader", ROHR Spezialfahrzeuge GmbH, Straubing, Germany, date unknown, 2 pages.
(Continued)

*Primary Examiner* — Thomas Randazzo
(74) *Attorney, Agent, or Firm* — Foley IP Law, PLLC

(57) ABSTRACT

Examples provide a system for a temperature-controlled receiving tunnel. A main body includes an interior compartment and a set of adjustable bulkheads configured to create a set of temperature-controlled zones within the interior compartment. A set of cooling devices are configured to adjust an internal temperature of the set of temperature-controlled zones within the interior compartment. A control device analyzes dynamic truck delivery data and ambient temperature data to generate a predicted cooling time and a cooling initiation time. The predicted cooling time comprises an estimated quantity of time after the cooling initiation time to reach a target temperature within a selected zone in the set of temperature-controlled zones.

20 Claims, 14 Drawing Sheets

Related U.S. Application Data

(60) Provisional application No. 62/909,798, filed on Oct. 3, 2019.

(51) Int. Cl.
  *B65G 69/00* (2006.01)
  *B65G 69/28* (2006.01)
  *B66F 9/06* (2006.01)
  *F24F 1/00* (2019.01)
  *F24F 11/63* (2018.01)

(52) U.S. Cl.
  CPC ......... *B65G 69/006* (2013.01); *B65G 69/008* (2013.01); *B65G 69/2817* (2013.01); *B66F 9/063* (2013.01); *F24F 1/00* (2013.01); *F24F 11/63* (2018.01); *B65G 2203/0258* (2013.01); *B65G 2814/0302* (2013.01)

(58) Field of Classification Search
  CPC ........ B65G 69/2817; B65G 2203/0258; B65G 2814/0302; B66F 9/063; F24F 1/00; F24F 11/63; F24F 2110/10; F24F 2120/12; F24F 2140/40
  See application file for complete search history.

(56) References Cited

U.S. PATENT DOCUMENTS

| | | | | |
|---|---|---|---|---|
| 6,467,293 | B1* | 10/2002 | Goosman | B60H 1/3232 62/239 |
| 8,485,285 | B2* | 7/2013 | Ferrigni | B60P 3/20 296/24.35 |
| 9,511,960 | B1 | 12/2016 | Bradford | |
| 9,567,168 | B1* | 2/2017 | Tibbens | B65G 69/24 |
| 9,688,489 | B1 | 6/2017 | Zevenbergen et al. | |
| 9,846,086 | B1* | 12/2017 | Robinson | G01K 3/04 |
| 9,884,734 | B1* | 2/2018 | Garner | B65G 67/20 |
| 10,137,816 | B2 | 11/2018 | Harper et al. | |
| 2007/0166120 | A1* | 7/2007 | Nelson | G03G 21/186 410/130 |
| 2008/0012371 | A1* | 1/2008 | Brussard | E06B 3/80 296/24.41 |
| 2008/0036238 | A1* | 2/2008 | Weeda | B60P 3/20 296/146.1 |
| 2010/0089911 | A1* | 4/2010 | Haddad | B65D 90/0066 220/592.2 |
| 2017/0349079 | A1* | 12/2017 | Wilkinson | B65G 1/06 |
| 2018/0101818 | A1* | 4/2018 | Simms | G06Q 10/08 |
| 2018/0105092 | A1* | 4/2018 | Putcha | B60P 1/36 |
| 2018/0290831 | A1* | 10/2018 | Wolf | F25D 13/06 |
| 2020/0393186 | A1* | 12/2020 | Horii | F25D 17/045 |

OTHER PUBLICATIONS

Unknown, "4SIGHT", 4SIGHT Logistics Solution, https://4sightsolution.com/our-solutions/#hvls-fan-system_1, Jun. 7, 2019, 5 pages.

Unknown, "Dock Shelter", armo, ww.armoweb.it/en/dock-shelters/loading-tunnel/, Jun. 5, 2019, 4 pages.

Unknown, "Cold Chain compliant loading zone improves refrigerated logistics", SAFETECH, https://www.safetech.com.au/cold-chain-compliant-dock-system/, Jul. 21, 2017, 3 pages.

Fikiin, Kostadin et al., "Efficient loading and unloading of a food cold store", EHEDG: Cold Chain, New Food, vol. 17, Issue 6, 2014, 6 pages.

\* cited by examiner

TEMPERATURE-CONTROLLED RECEIVING TUNNEL

BACKGROUND

Stores receive truck delivery of supplies and products at different hours and days of the week. These deliveries sometimes include temperature-sensitive items, such as, but not limited to, frozen foods, dairy products and produce. These items require refrigeration during transport and storage. However, some stores can only accept deliveries during the stores open hours of operation. When the store is closed, there may be no personnel available to accept delivery and/or placed delivered items into a temperature-controlled storage within the store. This can result in limited delivery schedules, inefficient resource utilization and/or inconvenience to delivery drivers that have to restrict deliveries to a stores open hours.

SUMMARY

Some examples provide a temperature-controlled receiving tunnel. A set of cooling devices associated with the top member configured to adjust an internal temperature of an interior compartment within a main body of the receiving tunnel. A set of adjustable bulkheads associated with the top member include at least one adjustable bulkhead that drops down to create a set of temperature-controlled zones within the interior compartment. A control device includes a processor communicatively coupled to a memory. A temperature manager component analyzes dynamic truck delivery data and ambient temperature data to generate a predicted cooling time and a cooling initiation time. The predicted cooling time includes an estimated quantity of time after cooling initiation to reach a target temperature for a set of pallets within a selected zone in the set of temperature-controlled zones. A door is associated with the first end of the main body. A docking device is associated with the first end of the main body. The docking device is configured to connect to an end of a delivery truck. An autonomous pallet loader is associated with the interior compartment to move a set of pallets from a storage area within the delivery truck connected to the collapsible docking device into at least one temperature-controlled zone within the interior compartment of the main body.

Other examples provide a temperature-controlled receiving tunnel. A set of cooling devices associated with a top member of the temperature-controlled receiving tunnel is configured to adjust an internal temperature of an interior compartment within the interior compartment. A control device includes at least one processor communicatively coupled to a memory. A temperature manager component analyzes dynamic truck delivery data and ambient temperature data to generate a predicted cooling time and a cooling initiation time. The predicted cooling time comprising an estimated quantity of time after cooling initiation to reach a target temperature for a set of pallets within a selected zone in a set of temperature-controlled zones within a receiving tunnel. A set of sensor devices associated with an interior compartment of the receiving tunnel. A guidance system analyzes sensor data associated with a location of the end of the delivery truck and outputs instructions assisting a driver of the delivery truck with connecting to the collapsible docking device. An adjustable docking device is associated with a first end of the main body. The adjustable docking device connects to an end of a delivery truck associated with an unloading door of the delivery truck. The adjustable docking device connects the receiving tunnel with the delivery truck.

Still other examples provide a receiving tunnel. A main body of the receiving tunnel includes a first end, a second end, a first side member, a second side member, a top member, and a floor member. A set of cooling devices associated with the top member is configured to adjust an internal temperature of an interior compartment within the main body. A set of adjustable bulkheads is associated with the top member. An adjustable bulkhead in the set of adjustable bulkheads drops down to create a set of temperature-controlled zones within the interior compartment. A docking device is associated with first end of the main body. The docking device is configured to connect to an end of a delivery truck. A pneumatic lift is configured to self-level at least a portion of the main body based on a height of the delivery truck. A set of sensor devices associated with the interior compartment generates sensor data associated with at least one item within the main body. A first aperture associated with the first end of the main body connects the interior compartment of the receiving tunnel with an interior storage area of the delivery truck.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable a temperature-controlled receiving tunnel. In some examples, the temperature-controlled receiving tunnel is portable and provides temporary storage of items and/or a pass-through tunnel leading into a storage area of a receiving facility. The receiving trailer enables after-hours access to a portable storage location for drop-off of deliveries/pallets by a third-party, such as a delivery truck driver, without permitting the third-party access to the interior of the receiving facility while the facility is closed/unmanned. This improves security while providing increased flexibility for delivery of items/pallets to the facility.

The receiving trailer in other examples includes a set of temperature-controlled (refrigerated/freezer) zones. This enables products stored in the receiving truck to be kept at the correct storage temperature for frozen, chilled, or ambient temperature items.

Figure 1:
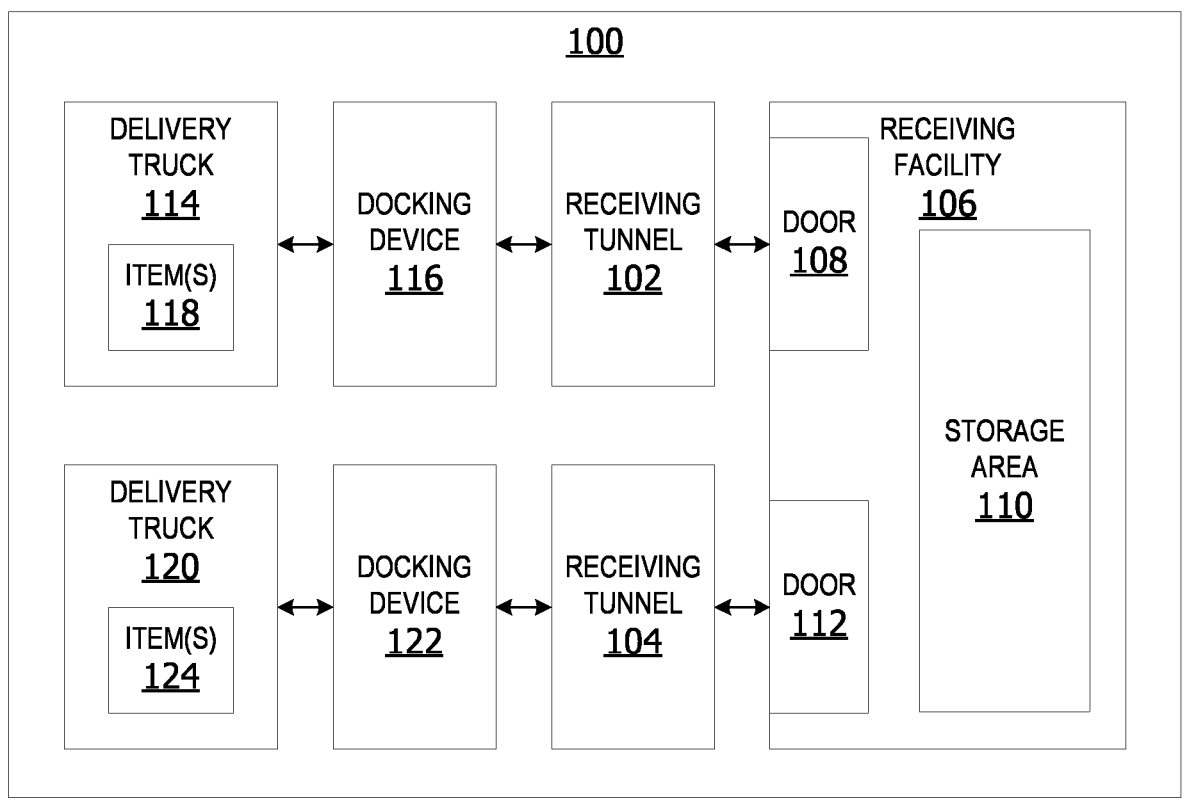
FIG. 1 is an exemplary block diagram illustrating a system providing a set of adjustable temperature-controlled receiving tunnels.

FIG. 1 is an exemplary block diagram illustrating a system 100 providing a set of adjustable temperature-controlled receiving tunnels. In this example, the set of adjustable temperature-controlled receiving tunnels includes a first receiving tunnel 102 and a second receiving tunnel 104 providing temporary storage for a receiving facility 106.

In this example, the receiving facility 106 includes a first door 108 providing access into a storage area 110 associated with the first receiving tunnel 102 when open. A second door 112 is associated with the second receiving tunnel 104 provides access into the storage area 110 when open. In other examples, the receiving facility 106 can include a single door, as well as three or more doors providing access into one or more storage areas.

In this example, a first delivery truck 114 connects to one end of the receiving tunnel 102 via a docking device 116. The docking device 116 connects to the back end of the delivery truck associated with the cargo/storage area storing one or more item(s) 118, such as, but not limited to, a set of pallets. The other side of the docking device 116 connects to the back end of the receiving tunnel associated with a door providing access to an interior compartment of the receiving tunnel providing storage space for the item(s) 118. In some examples, the docking device provides an accordion dock seal to compensate for dock slope and angle of the backing in delivery truck trailer.

The item(s) 118 can be moved into the receiving tunnel 102 for storage or the item(s) 118 can be moved through the receiving tunnel and directly into the storage area 110 of the receiving facility via the door 108 on the receiving facility 106.

In this example, another delivery truck 120 can connect to the second receiving tunnel 104 via a second docking device 122 associated with the receiving tunnel 104. The item(s) 124 can be temporarily stored inside the temperature-controlled interior of the receiving tunnel 104 or transported through the receiving tunnel 104 directly into the storage area 110.

In some non-limiting examples, the docking device is collapsible. The docking device can expand during connection with the delivery truck and fold or collapse (accordion-style) when the docking device is not in use.

In this example, two delivery trucks are able to unload pallets into the set of two receiving tunnels simultaneously. In other examples, a single delivery truck unloads items into a single receiving tunnel. In still other examples, three or more delivery trucks can unload items simultaneously into three or more receiving tunnels simultaneously. In other words, if there are four receiving tunnels associated with the receiving facility, then four delivery trucks can unload pallets into the set of receiving tunnels simultaneously.

Figure 2:
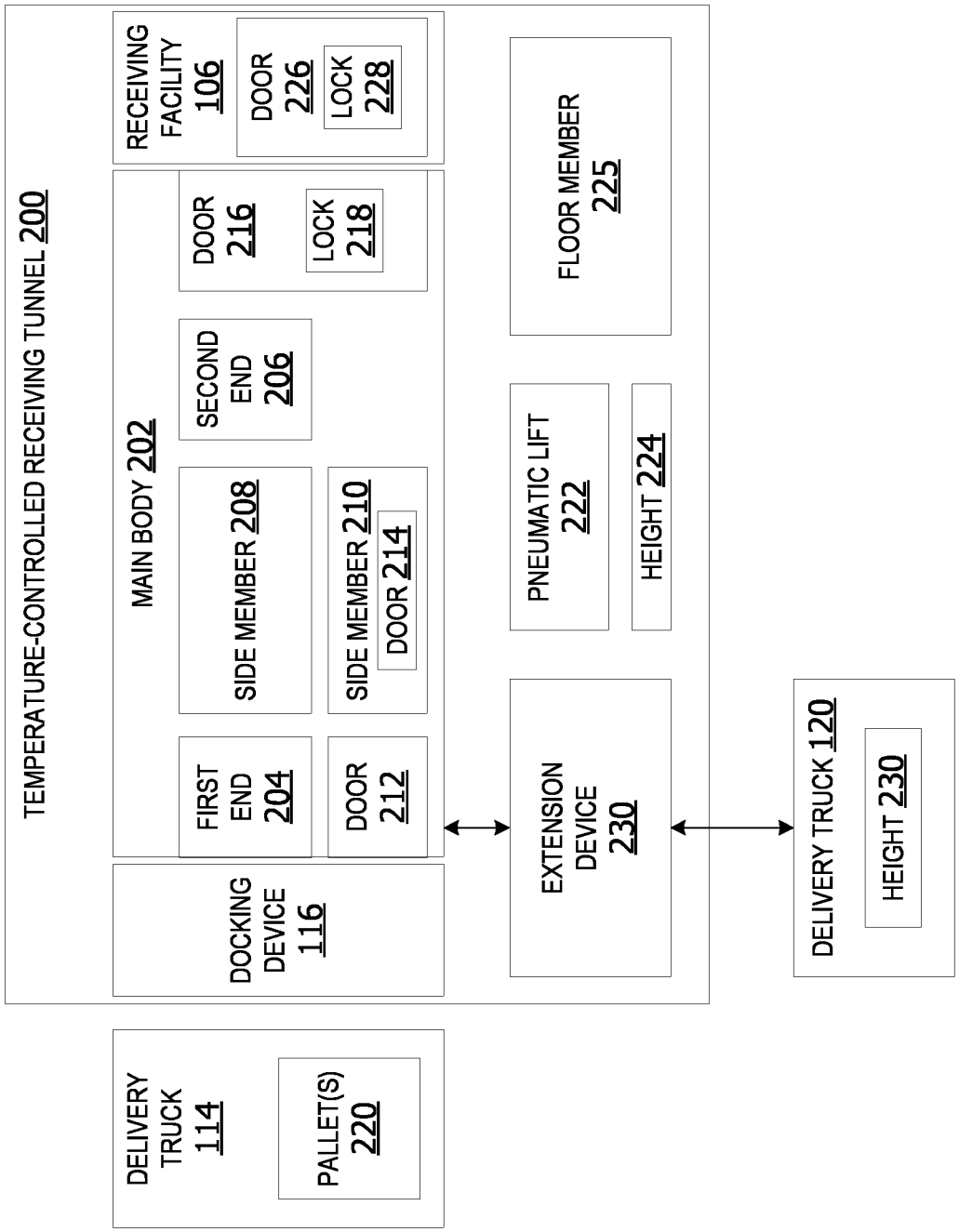
FIG. 2 is an exemplary block diagram illustrating a temperature-controlled receiving tunnel.

FIG. 2 is an exemplary block diagram illustrating a temperature-controlled receiving tunnel 200. The temperature-controlled receiving tunnel 200 includes a main body 202 having a first end 204, a second end 206, a side member 208, and a second side member 210. The receiving tunnel includes a door 212 in the first end 204, a door 216 in the second end 206 and a side door 214 in the side member 210. Each of the doors can include a lock, such as, but not limited to, the lock 218 in the second end 206.

The lock 218 can be implemented as a key lock, a coded lock, a biometric lock, a combination lock, a key card lock, or any other type of lock. A biometric lock can include a lock which is opened using fingerprint, facial recognition, retinal scan, voice recognition or any other type of biometrics. The lock in other examples can be opened by a user device associated with the driver, such as a cellular telephone or a tablet computing device.

In this example, a delivery truck 114 connects to the temperature-controlled receiving tunnel 200 via a docking device 116. When the back door of the delivery truck is open and the door 212 in the end 204 of the receiving tunnel is open it creates an opening/aperture between the interior of the delivery truck storage area and the interior of the receiving truck through the docking device 116. This enables the pallet(s) 220 or other items inside the delivery truck to be moved smoothly into the interior of the temperature-controlled receiving tunnel 200.

In some examples, a pneumatic lift 222 adjusts the height 224 of the receiving tunnel to self-level at least a portion of the main body 202 and/or the floor member 225 based on the height of the delivery truck, such as, but not limited to, the delivery truck 114 and/or the delivery truck 120. The pneumatic lift 222 is utilized during the initial docking procedure to connect the delivery truck 114 to the temperature-controlled receiving tunnel 200. In other words, the receiving tunnel self-levels based on trailer height with one or more electrically operated pneumatic lifts.

In another example, the door 216 of the receiving tunnel is opened and the door 226 of the receiving facility 106 is opened to create an aperture between the interior of the temperature-controlled receiving tunnel 200 and the interior of the receiving facility 106. The opening enables items within the receiving tunnel to be moved into the receiving facility 106.

In another example, an extension device 230 enables the temperature-controlled receiving tunnel 200 to connect to a delivery truck which is not aligned with the door 212 in the receiving end 204 of the receiving tunnel. In some examples, the extension device 230 is a flexible extension device including a turntable configured to rotate within a one-hundred- and twenty-degree range. The extension device 230 can connect an end of the delivery truck 120 while it is unaligned with the first end of the main body of the receiving tunnel. The first end of the main body can also be referred to as the first end of the receiving tunnel. In one example, the extension device 230 can connect to the delivery truck while it is parked perpendicular to the receiving tunnel or parallel to another delivery truck connected to the door 212.

Figure 3:
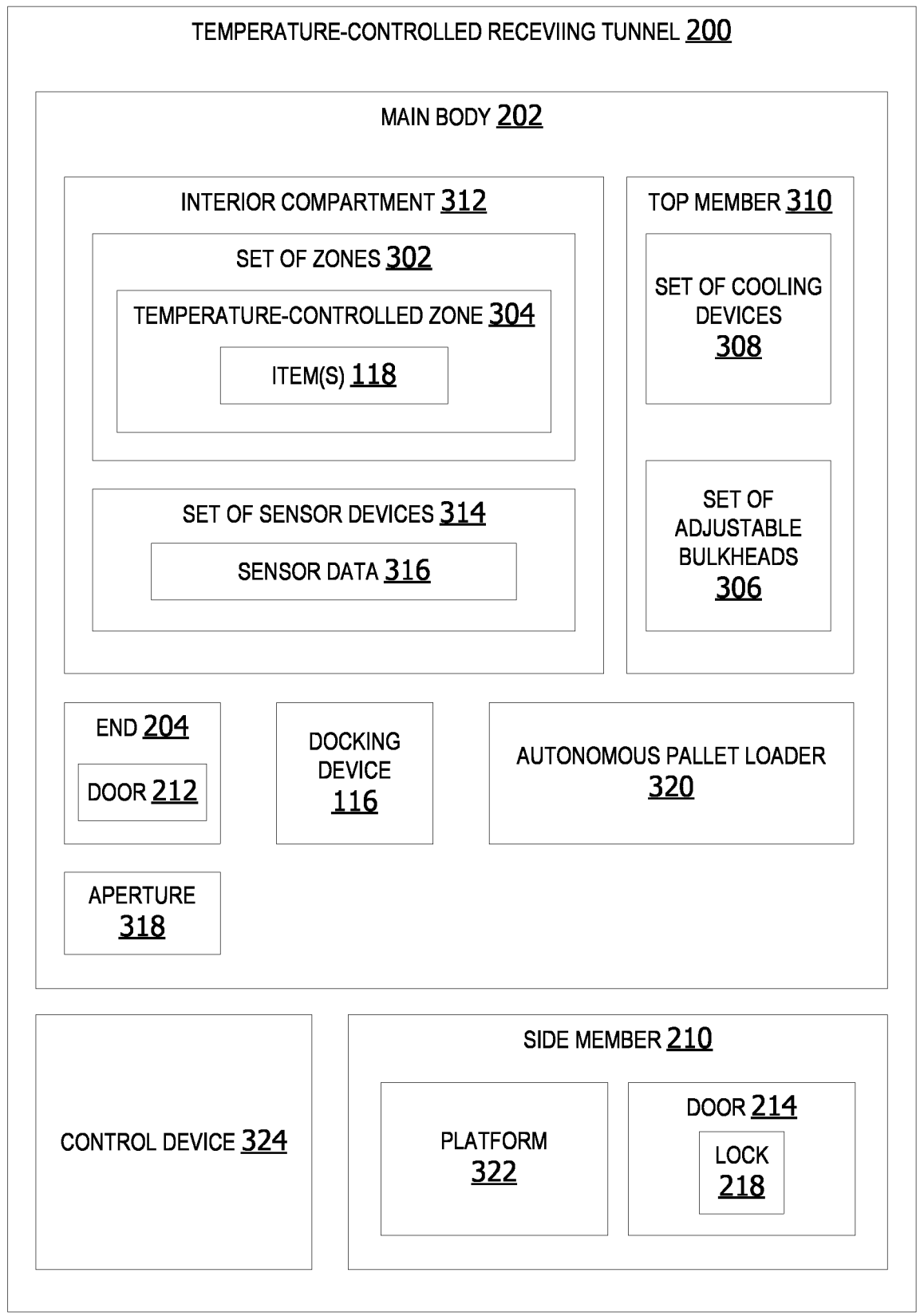
FIG. 3 is an exemplary block diagram illustrating a temperature-controlled receiving tunnel including a set of temperature-controlled zones.

FIG. 3 is an exemplary block diagram illustrating a temperature-controlled receiving tunnel 200 including a set of temperature-controlled zones. The main body 202 of the receiving tunnel in this non-limiting example includes a set of one or more zones 302, including at least one temperature-controlled zone 304 storing one or more item(s) 118. A set of one or more adjustable bulkheads 306 and a set of one or more cooling devices 308 associated with a top member 310 of the temperature-controlled receiving tunnel 200 creates the set of zones 302 within the interior compartment 312 of the receiving tunnel.

In some examples, a bulkhead in the set of adjustable bulkheads 306 is an autonomous bulkheads. The autonomous bulkhead drops downward automatically after all items/pallets for a selected zone are placed in the selected zone. The system can determine all items/pallets have been placed in a zone based on weight of the items/pallets, camera images (image data) of the items/pallets in the zone, sensor data (scanner data generated by scanning item/pallet barcodes) and/or input from a user indicating all items/pallets have been placed. After unloading all of the items into one temperature-controlled zone, at least one bulkhead automatically drops-down from the ceiling/top member. The bulkhead adjusts to segregate the freight/pallets inside the selected zone with motorized pulleys and cables.

In one example, the delivery truck driver pulls a rope at bottom and the bulkhead(s) nest up at the ceiling. The driver can release the rope and pulley to drop-down the bulkhead(s). The bulkheads can also slide forward or back along a track to adjust the size of each zone. In other words, the size of the temperature-controlled zones are adjustable and customizable based on the number of pallets/amount of space required to accommodate the items/pallets to be placed in each zone.

In some examples, the temperature-controlled receiving tunnel 200 includes a set of one or more sensor devices 314 generating sensor data 316 associated with the item(s) 118 within the interior compartment 312. In other words, as items are placed inside the temperature-controlled receiving tunnel 200, the set of sensor devices 314 scans the items. The sensor data 316 is analyzes to identify the pallets/items placed into the receiving tunnel, update inventory records for items inside the receiving tunnel, etc.

In some examples, the set of sensor devices 314 optionally includes light detection and ranging (LIDAR) externally to the receiving trailer, LIDAR internally to the receiving trailer, one or more temperature sensors, one or more hygrometers (humidity sensors), one or more biometric sensors, BLUETOOTH®, Wi-Fi, near-field communication (NFC), simultaneous localization and mapping (SLAM), one or more cameras, machine vision, alarm system(s), motion detection, barcode scanners, or any other type of sensor devices.

In some examples, a door 212 in the receiving end 204 of the temperature-controlled receiving tunnel 200 can be opened to create an aperture permitting access with the interior compartment 312. The item(s) are moved through the aperture 318 from a delivery truck into the temperature-controlled receiving tunnel 200.

An autonomous pallet loader 320 can optionally be included inside the temperature-controlled receiving tunnel 200. The autonomous pallet loader 320 automatically moves pallets or other items off the delivery truck and into the temperature-controlled receiving tunnel 200.

In still other examples, the side member 210 of the temperature-controlled receiving tunnel 200 can include a side door 214 and a platform 322 enabling the driver of the delivery truck or other user to enter the interior compartment 312 of the temperature-controlled receiving tunnel 200 via the door 214. The door 214 can include a lock, such as the lock 218. The lock can be a keyed lock, a biometric lock, a coded lock, or any other type of lock.

The temperature-controlled receiving tunnel 200 can optionally also include a control device 324. The control device 324 includes a computing device for controlling the cooling units, adjusting internal temperature within each zone, etc.

Figure 4:
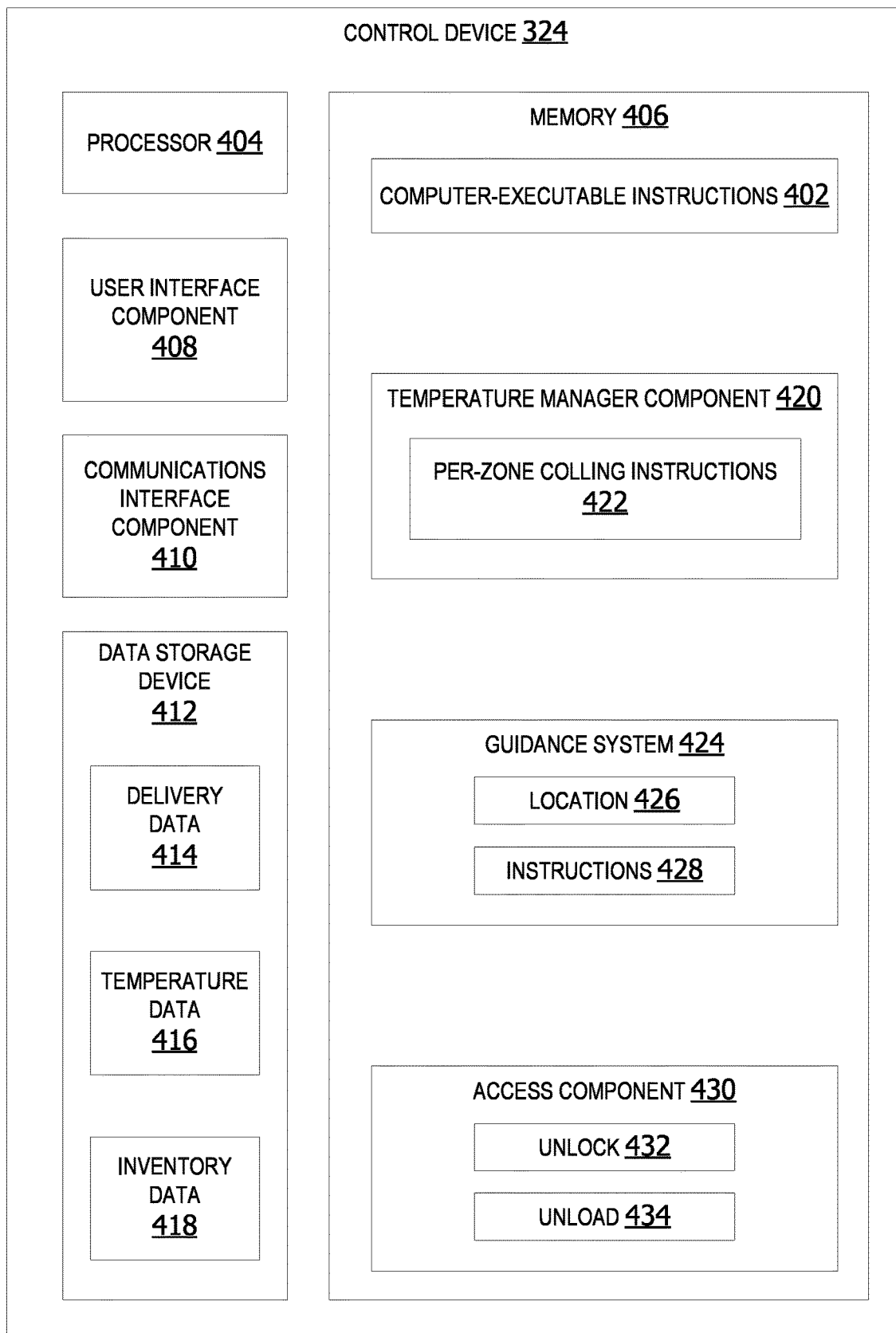
FIG. 4 is an exemplary block diagram illustrating a control device.

FIG. 4 is an exemplary block diagram illustrating a control device 324. In the example of FIG. 1, the control device 324 represents any device executing computer-executable instructions 402 (e.g., as application programs, operating system functionality, or both) to implement the operations and functionality associated with the control device 324.

In some examples, the control device 324 has at least one processor 404 and a memory 406. The control device 324 in other examples includes a user interface component 408.

The processor 404 includes any quantity of processing units and is programmed to execute the computer-executable instructions 402. The computer-executable instructions 402 is performed by the processor 404, performed by multiple processors within the control device 324 or performed by a processor external to the receiving tunnel. In some examples, the processor 404 is programmed to execute instructions such as those illustrated in the figures (e.g., FIG. 13 and FIG. 14).

The control device 324 further has one or more computer-readable media such as the memory 406. The memory 406 includes any quantity of media associated with or accessible by the control device 324. The memory 406 in these examples is internal to the control device 324 (as shown in FIG. 4). In other examples, the memory 406 is external to the receiving tunnel (not shown) or both (not shown).

The memory 406 stores data, such as one or more applications. The applications, when executed by the processor 404, operate to perform functionality on the receiving tunnel. The applications can communicate with counterpart applications or services such as web services accessible via a network. In an example, the applications represent downloaded client-side applications that correspond to server-side services executing in a cloud.

In other examples, the user interface component 408 includes a graphics card for displaying data to the user and receiving data from the user. The user interface component 408 can also include computer-executable instructions (e.g., a driver) for operating the graphics card. Further, the user interface component 408 can include a display (e.g., a touch screen display or natural user interface) and/or computer-executable instructions (e.g., a driver) for operating the display. The user interface component 408 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

In some examples, the receiving tunnel optionally includes a communications interface component 410. The communications interface component 410 includes a network interface card and/or computer-executable instructions (e.g., a driver) for operating the network interface card. Communication between the receiving tunnel and other devices, such as a cloud server, delivery truck, cloud storage or user device can occur using any protocol or mechanism over any wired or wireless connection. In some examples, the communications interface component 410 is operable with short range communication technologies such as by using NFC tags.

The receiving tunnel can optionally include a data storage device 412 for storing data, such as, but not limited to delivery data 414, temperature data 416 and/or inventory data 418. The delivery data 414 includes data associated with one or more expected delivery trucks. The delivery data 414 can include estimated arrival time of a delivery truck, shipment invoice data, GPS data associated with an expected delivery truck, date, and time of expected truck arrival, etc.

The temperature data 416 can include current temperature outside the receiving tunnel (ambient temperature), current temperature inside the receiving tunnel, weather forecast (predicted future temperature), humidity outside the receiving tunnel, humidity inside the receiving tunnel, etc.

The inventory data 418 includes data associated with inventory of a delivery truck, inventory of a receiving facility and/or inventory of items inside the receiving tunnel. The system can update the inventory data 418 in real-time as items are loaded into the receiving tunnel and/or as items are removed from the receiving tunnel. The system can also update the inventory data 418 in real-time as items are moved from the receiving tunnel into the receiving facility.

The data storage device 412 can include one or more different types of data storage devices, such as, for example, one or more rotating disks drives, one or more solid state drives (SSDs), and/or any other type of data storage device. The data storage device 412 in some non-limiting examples includes a redundant array of independent disks (RAID) array. In other examples, the data storage device 412 includes a database.

The data storage device 412 in this example is included within the control device or otherwise associated with the receiving tunnel. In other examples, the data storage device 412 includes a remote data storage accessed by the control device via a network, such as a remote data storage device, a data storage in a remote data center, or a cloud storage.

The memory 406 in some examples stores one or more computer-executable components executed by the processor 404, such as, but not limited to, the temperature manager component 420.

The temperature manager component 420 in some examples analyzes dynamic truck delivery data 414 and ambient temperature data 416 to generate per-zone cooling instructions 422 for each zone in the set of temperature-controlled zones within the receiving tunnel. The per-zone cooling instructions include a predicted cooling time and/or a cooling initiation time. The predicted cooling time includes an estimated quantity of time (time-period) after cooling initiation to reach a target temperature for a set of pallets within a selected zone in the set of temperature-controlled zones. The cooling initiation time is the time at which a set of cooling units associated with a temperature-controlled zone are turned on to begin cooling the space within the selected zone.

In some examples, a guidance system 424 analyzes sensor data associated with a location 426 of the end of the delivery truck and outputs instructions 428 assisting a driver of the delivery truck with connecting to the docking device.

An access component 430 in some examples can automatically unlock 432 a door associated with a receiving facility to enable access to an interior storage area within the receiving facility to initiate autonomous unload 434 a set of items from the receiving tunnel into the receiving facility. In other words, the access component initiates and assist automatic transfer of pallets from the receiving tunnel into the receiving facility.

Figure 5:
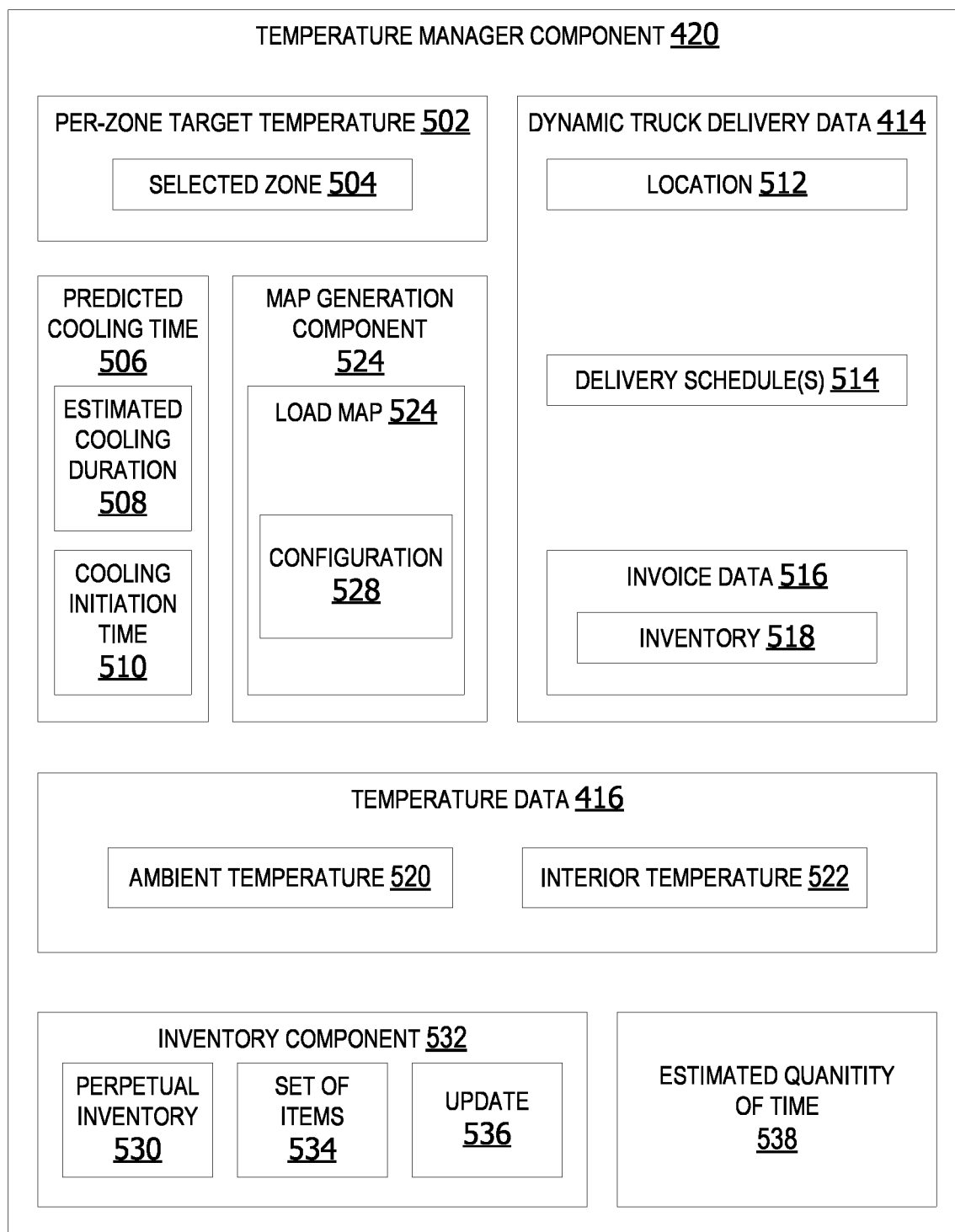
FIG. 5 is an exemplary block diagram illustrating a temperature manager component.

FIG. 5 is an exemplary block diagram illustrating a temperature manager component 420. The temperature manager component 420 in some examples generates a per-zone target temperature 502 for a selected zone in the set of temperature-controlled zones within the receiving tunnel. The target temperature is the temperature at which items within a zone should be stored. For example, if ice cream which is going to be placed into the selected zone should be stored at thirty-two degrees Fahrenheit, the per-zone target temperature 502 for the selected zone 504 is thirty-two degrees Fahrenheit. The temperature manager component 420 calculates a predicted cooling time 506 to bring the interior temperature of the selected zone to the target temperature by the expected delivery time of the ice cream shipment (expected ice cream arrival time).

The predicted cooling time 506 can include the estimated cooling duration 508 and the cooling initiation time 510. The estimated cooling duration 508 is the amount of time it is expected to take for the set of cooling units to lower the temperature within the selected zone to the target temperature. Based on temperature on outside of the receiving tunnel and how long it takes to cool the inside of the receiving tunnel, the system turns on the cooling units automatically to prepare the receiving tunnel to the target (correct) temperature when a delivery arrives. In one example, the receiving tunnel turns on the cooling unit one hour prior to the expected arrival of a shipment if the expected cooling duration to reach the target temperature is an hour.

The cooling initiation time 510 is the time at which the cooling unit(s) should be turned on so that the interior temperature of the selected zone will be at the target temperature when the items are placed into the selected zone. In other words, the predicted cooling time includes an estimated quantity of time 538 (time-period) after cooling initiation to reach a target temperature for a set of pallets within a selected zone in the set of temperature-controlled zones.

The temperature manager component 420 determines the predicted cooling time 506 based on temperature data 416 and dynamic truck delivery data 414. The dynamic truck delivery data 414 can include the current location 512 of a delivery truck, delivery schedule(s) 514 and/or invoice data 516, including inventory 518 of the delivery truck, inventory of the receiving tunnel and/or inventory of the receiving facility.

The temperature data 416 can include ambient temperature 520 outside the receiving tunnel and/or interior temperature 522 inside the receiving tunnel. The temperature data can also include humidity data. The ambient temperature can influence cooling duration. For example, it can take longer to cool the interior of a receiving tunnel during the summer in Texas than it would in North Dakota where the temperature in summer is lower than it is further South.

A map generation component 524 generates a load map 526 organizing placement of items within an interior compartment of the receiving tunnel for prioritized unloading based on delivery schedules, delivery inventory, and/or perpetual inventory 530 of a receiving facility associated with the receiving tunnel. The load map 526 provides a placement configuration 528 for placement of items within the interior compartment of the receiving tunnel. The load map indicates location of each pallet in the tunnel and order/sequence in which pallets are loaded or unloaded off the receiving tunnel. In one example, the automatic pallet loader determines best way to unload product into different temperature zones based on the load map and configuration.

An inventory component 532 performs an update 536 of perpetual inventory 530 (system inventory) associated with a receiving facility and/or the receiving tunnel. The perpetual inventory is updated to include a set of items 534 unloaded off the delivery truck and placed within the receiving tunnel.

Figure 6:
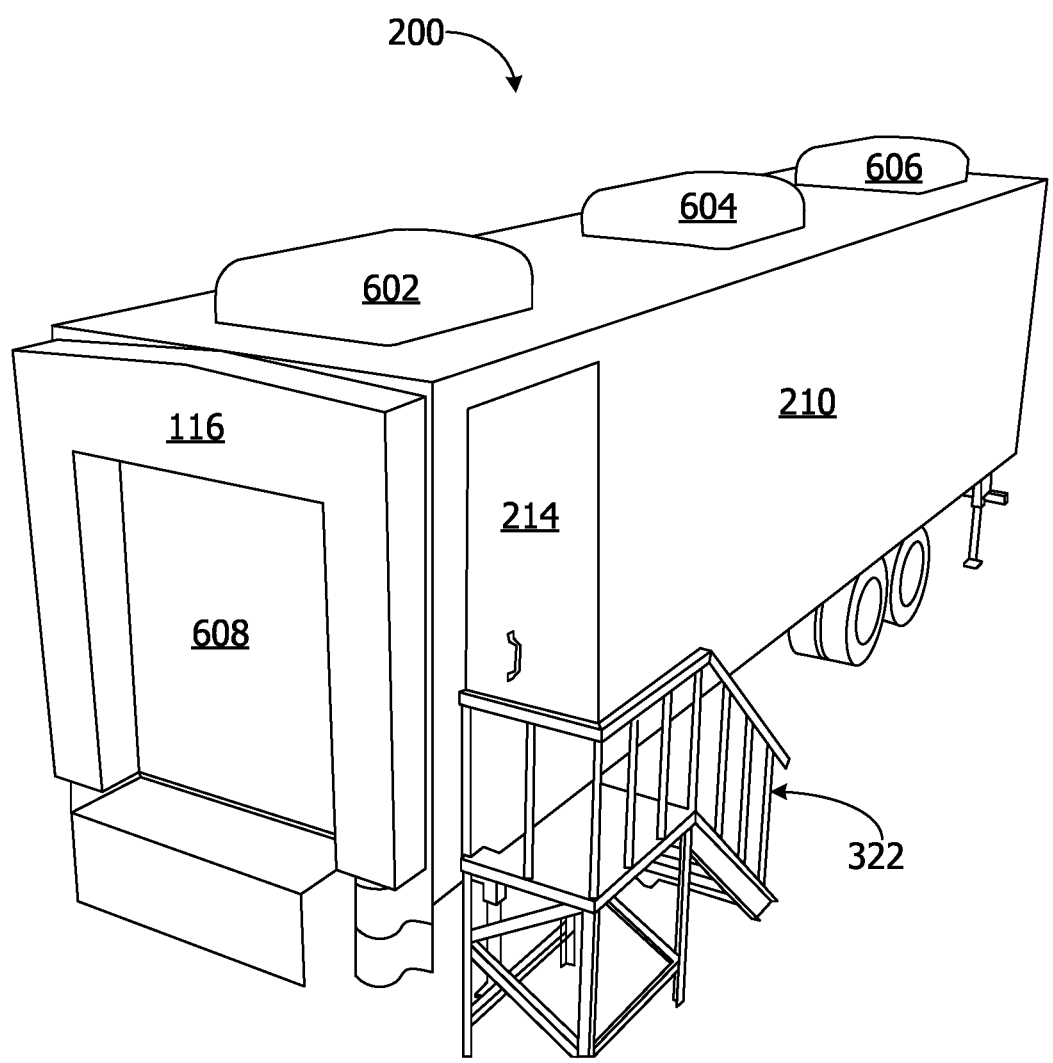
FIG. 6 is an exemplary block diagram illustrating a temperature-controlled receiving tunnel including a docking device.

FIG. 6 is an exemplary block diagram illustrating a temperature-controlled receiving tunnel 200 including a docking device 116. An aperture 608 is created when the back door of the temperature-controlled receiving tunnel 200 is open. A user can access the interior of the temperature-controlled receiving tunnel 200 via a side door 214 in the side member 210 of the temperature-controlled receiving tunnel 200. The temperature-controlled receiving tunnel 200 can optionally include a platform 322 having stairs and/or a rail enabling the user to reach the door 214.

The receiving trailer can include a set of cooling devices. In this example, the set of cooling devices (cooling units) include a first cooling unit 602, a second cooling unit 604 and/or a third cooling unit 606. In other examples, the receiving tunnel can include a single cooling unit, two cooling units, as well as four or more cooling units.

In other examples, the receiving tunnel includes a set of wheels which enables the receiving tunnel to be portable for easy transport/relocation. The receiving trailer in some examples is built on a trailer chassis which enables it to be moved easily from one location to another.

In still other examples, the receiving trailer is hardwired into the receiving facility to receive electricity for powering/operating the cooling units and other electronic devices on the receiving tunnel. Thus, the receiving tunnel does not require fuel or a generator to operate.

Figure 7:
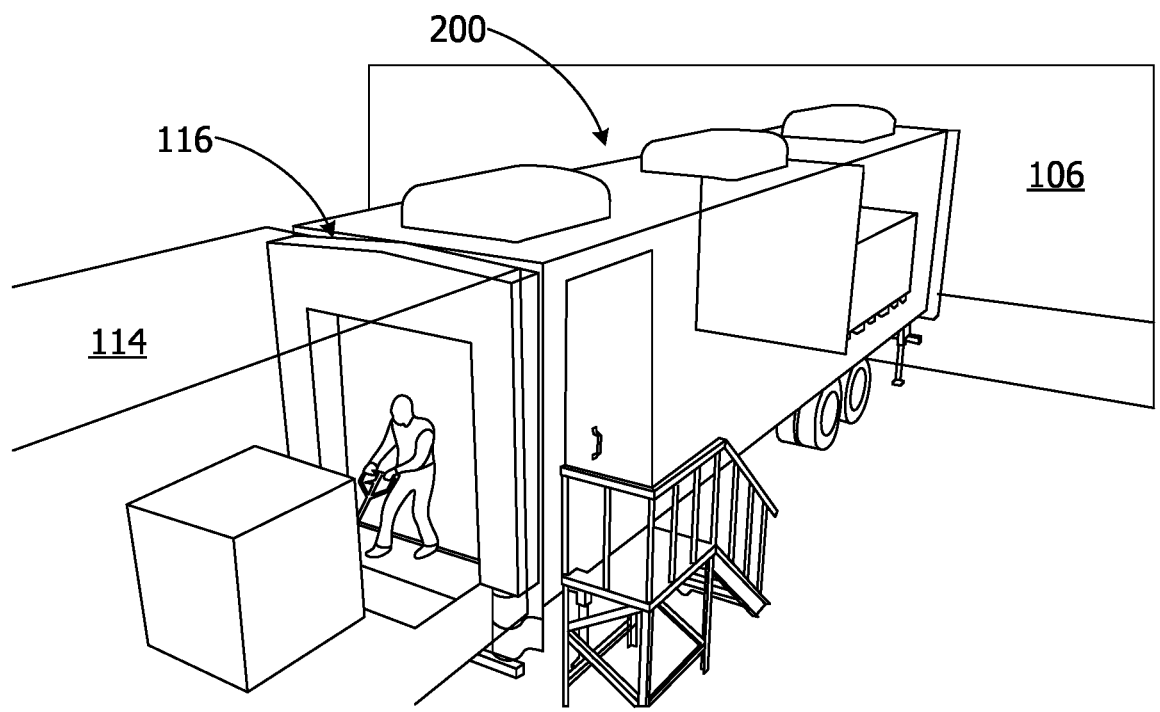
FIG. 7 is an exemplary block diagram illustrating a delivery truck connected to a receiving tunnel via a docking device.

FIG. 7 is an exemplary block diagram illustrating a delivery truck 114 connected to a receiving tunnel 200 via a docking device 116. A user can manually move pallets and/or other items from the delivery truck through the docking device into the temperature-controlled receiving tunnel 200.

In other examples, an automatic pallet loader can autonomously move the pallets/items into the receiving tunnel. Post-delivery of non-refrigerated product, the autonomous pallet loader (pallet jack) unloads product into the receiving facility (store), deactivates receiving facility alarms, opens door to receiving facility and moves items into the receiving facility automatically.

In some examples, the receiving tunnel is a fifty-three-foot-long trailer. In other examples, the receiving tunnel is between forty and fifty feet long. In still other non-limiting examples, the receiving tunnel is fifty-three feet long.

Figure 8:
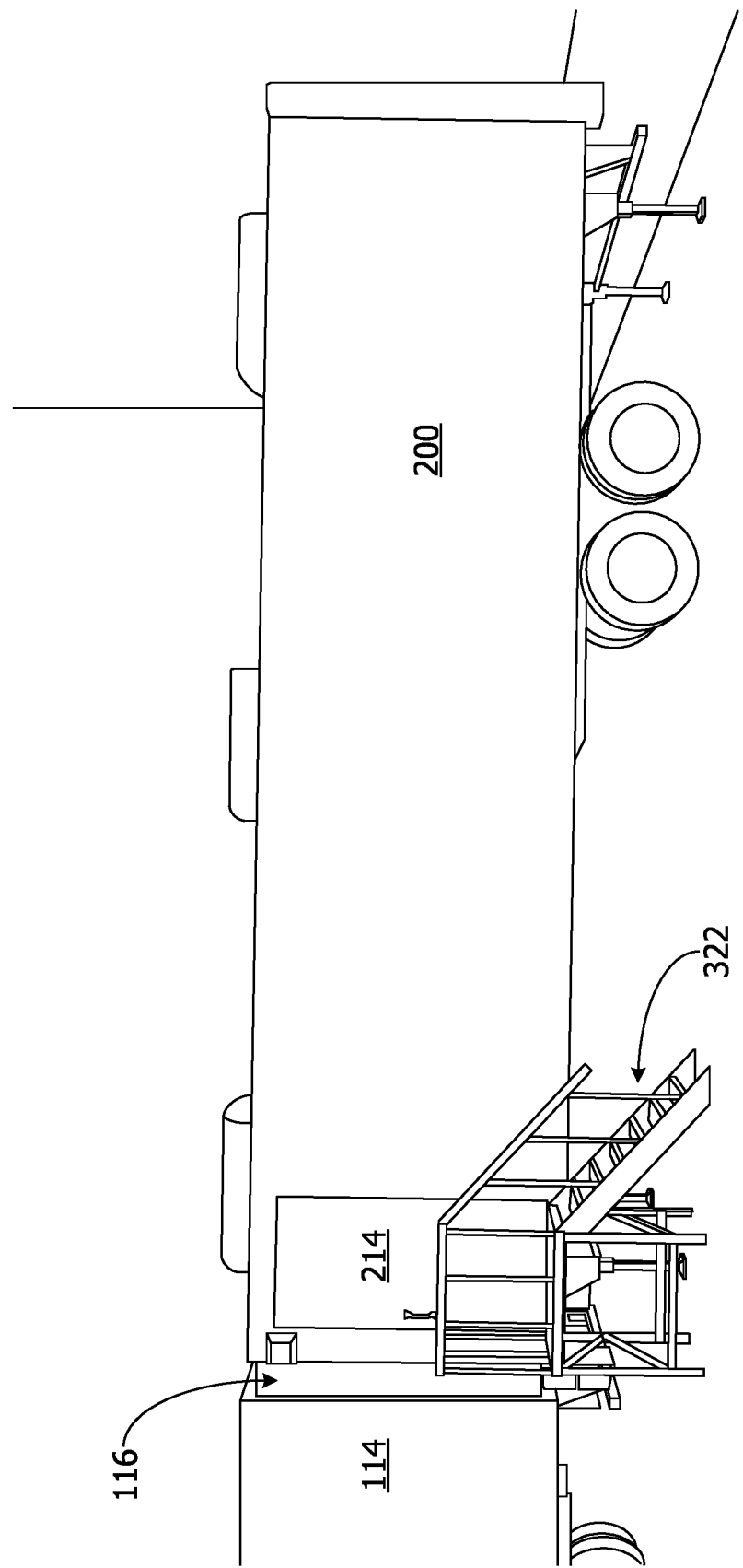
FIG. 8 is an exemplary block diagram illustrating a receiving tunnel having a side door and platform connected to a delivery truck via a docking device.

FIG. 8 is an exemplary block diagram illustrating a receiving tunnel 200 having a side door 214 and platform 322 connected to a delivery truck 114 via a docking device 116. The delivery truck backs up to the receiving tunnel and connects to the back of the receiving tunnel via the docking device.

Figure 9:
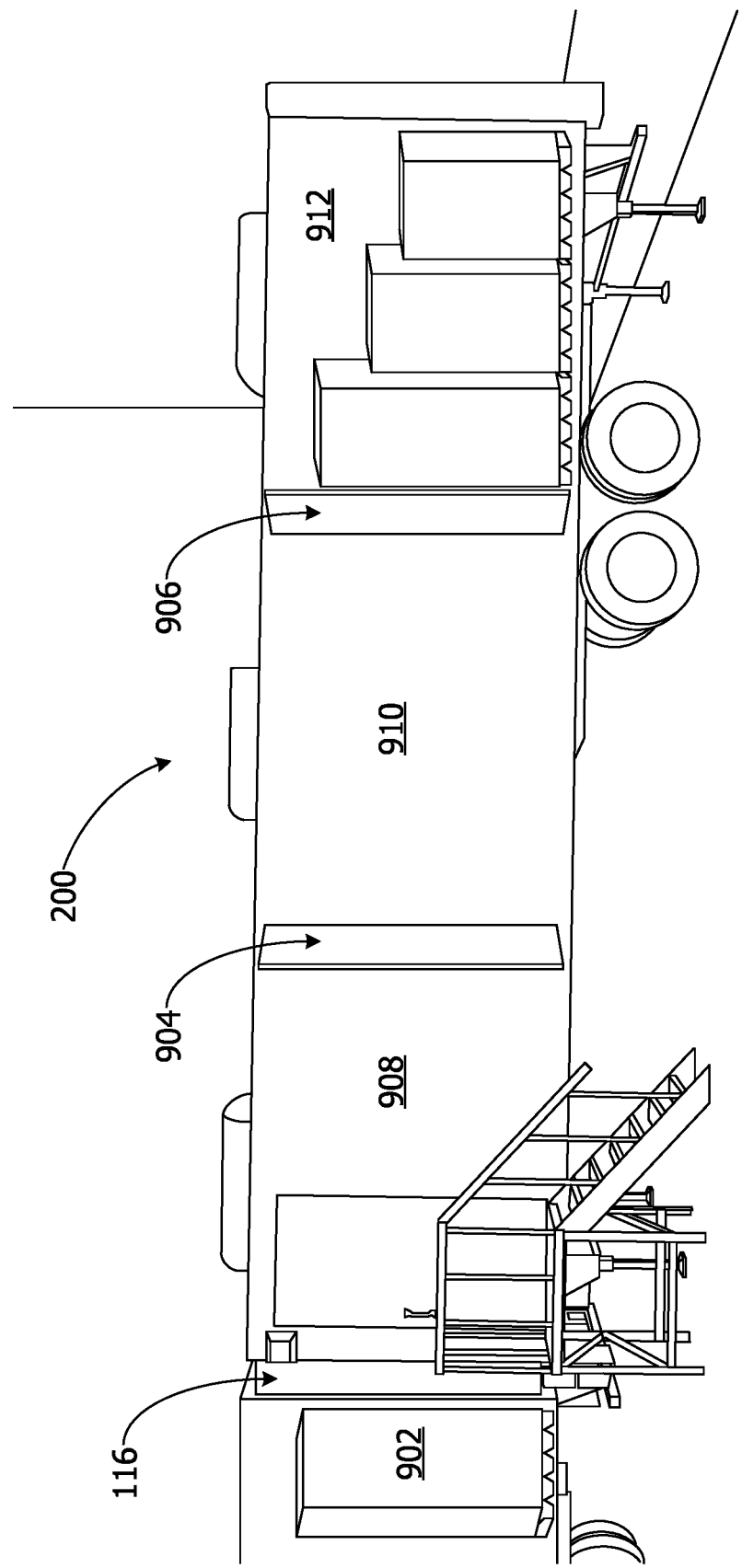
FIG. 9 is an exemplary block diagram illustrating a receiving tunnel including a set of bulkheads separating a set of temperature-controlled zones.

FIG. 9 is an exemplary block diagram illustrating a receiving tunnel 200 including a set of bulkheads separating a set of temperature-controlled zones. In this example, a pallet 902 can be moved from the delivery truck into one of the temperature-controlled zones. In this non-limiting example, a first zone 908 and a second zone 910 are created via the bulkhead 904. A third zone is created by the bulkhead 906. The bulkheads can fold up into the ceiling/top member of the receiving tunnel. In this example, each zone can be maintained at a different temperature.

The set of temperature-controlled zones includes three zones. In other examples, the set of temperature-controlled zones includes a single temperature-controlled zone using no bulkheads, two temperature-controlled zones using two bulkheads, as well as four or more zones.

Figure 10:
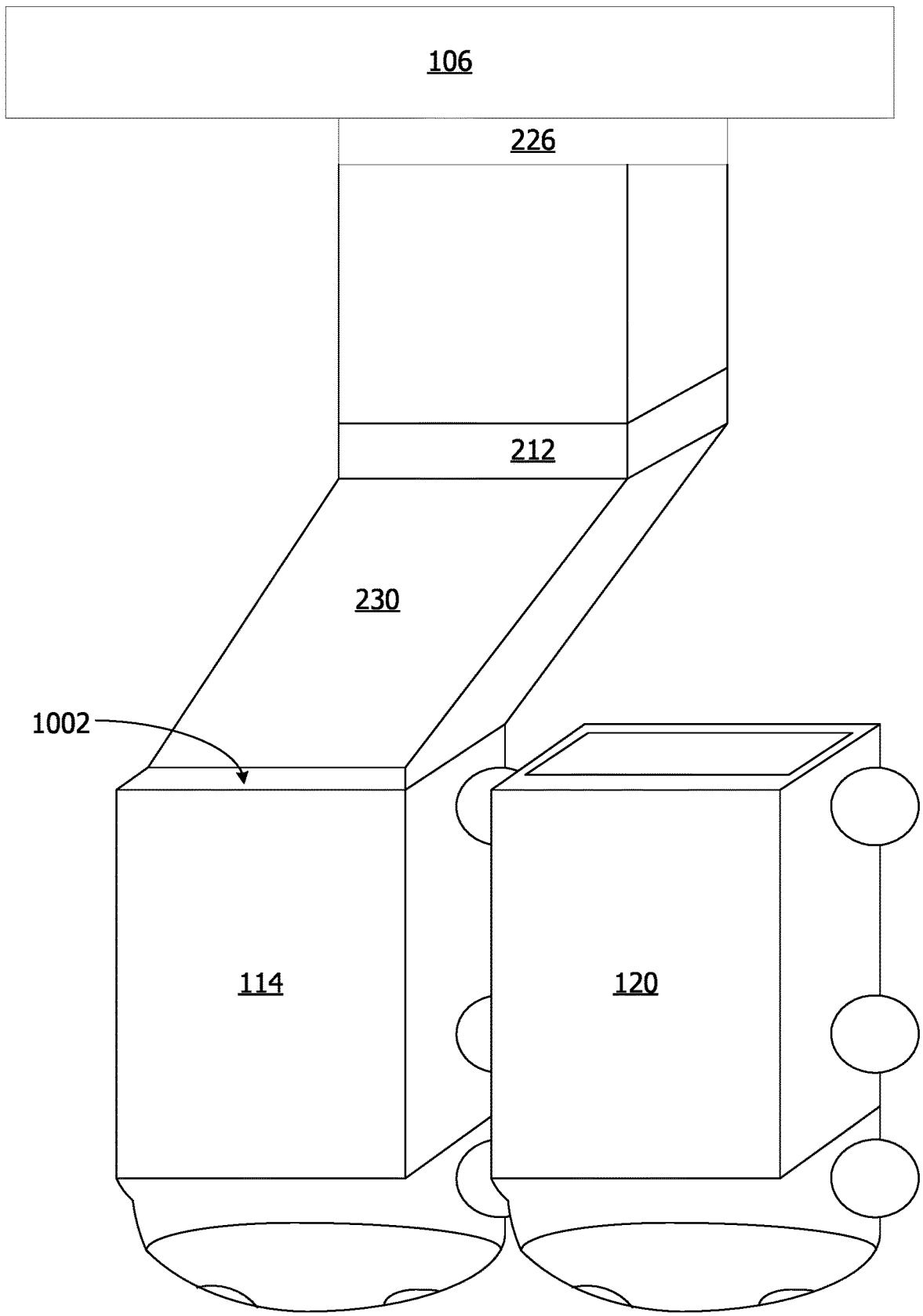
FIG. 10 is an exemplary block diagram illustrating a receiving tunnel including an extension device for connecting to an unaligned delivery truck at a receiving facility.

FIG. 10 is an exemplary block diagram illustrating a receiving tunnel 102 including an extension device 230 for connecting to an unaligned delivery truck 114 or the delivery truck 120 at a receiving facility. The extension device 230 extends and bends to attach to the back of the delivery truck. The extension device can move sideways/laterally to reach the back door of delivery trucks.

When the door 1002 on the delivery truck is opened and the door 212 on the receiving tunnel is open, the extension device creates a flexible and collapsible tunnel connecting the delivery truck with the receiving tunnel for unloading of items off the truck and into the receiving tunnel. If the other the door 226 of the receiving facility is open and the unloading door of the receiving tunnel is also open, the items inside the receiving tunnel can be moved smoothly and easily into the receiving facility 106. The receiving tunnel backs-up to the receiving facility (store) dock. The receiving trailer provides storage for facilities that do not have special, sectioned off delivery areas/storage areas for drop-off of deliveries.

After unloading of the first delivery truck 114 is complete, the extension device 230 can detach from the delivery truck 114 and attach to the waiting delivery truck 120. The extension device 230 in this non-limiting example can connect to the delivery truck 120 without requiring the delivery truck to move or connect in perfect alignment with the delivery truck 120.

In one non-limiting example, the last twelve feet of the extension device on one end is on a turntable which turns one-hundred and twenty degrees so it can turn and aim towards a trailer/delivery truck on the left and then a trailer/delivery truck on the right to unload multiple deliveries side by side. The flexible accordion piece can be hinged on the bottom enabling the end of the extension device to move forward to the top of the delivery trailer.

Figure 11:
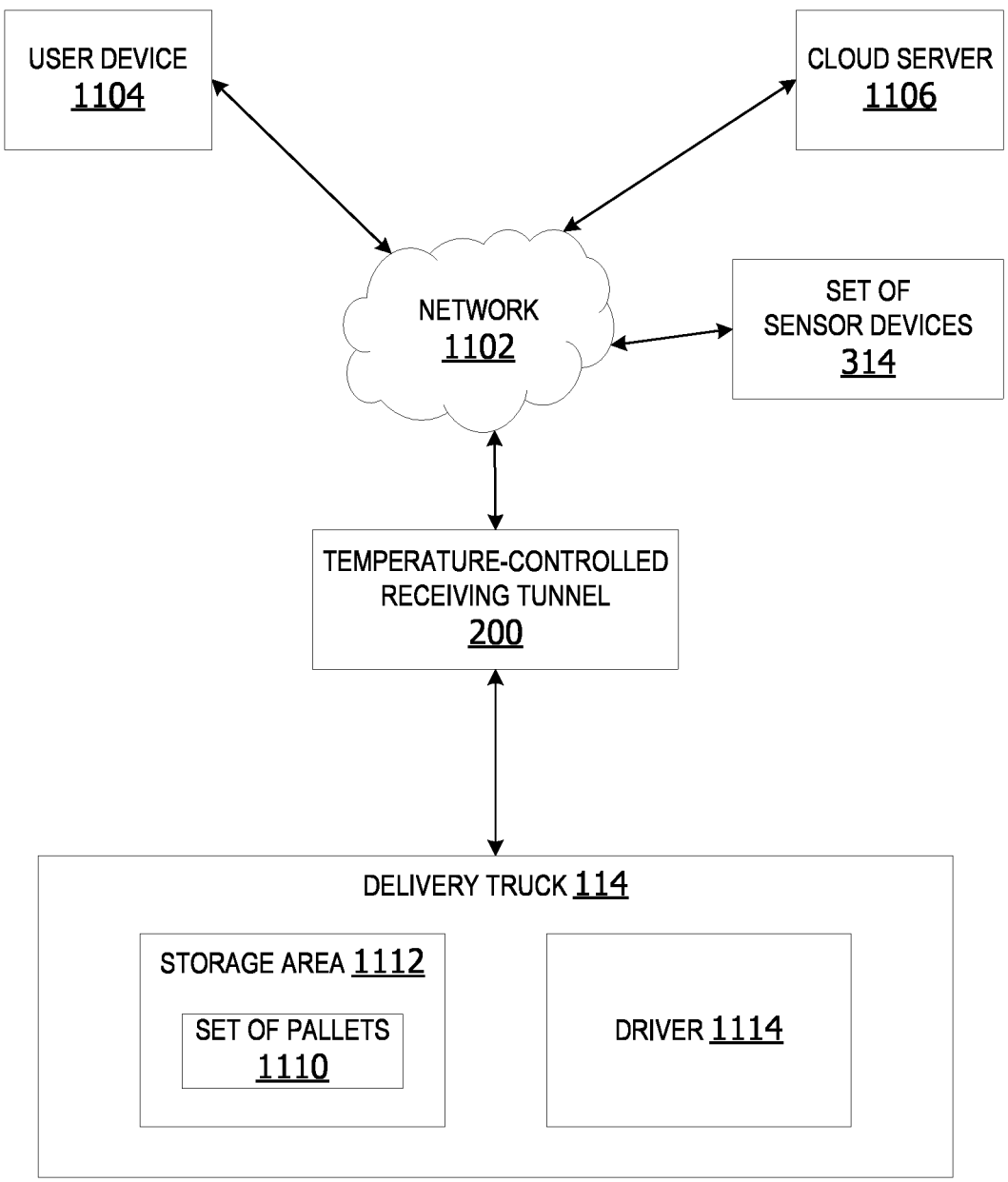
FIG. 11 is an exemplary block diagram illustrating a system for an adjustable temperature-controlled receiving tunnel.

FIG. 11 is an exemplary block diagram illustrating a system 1100 for an adjustable temperature-controlled receiving tunnel 200. In this non-limiting example, the temperature-controlled receiving tunnel 200 includes a communications interface component which enables the temperature-controlled receiving tunnel 200 to send and receive data via a network 1102.

The network 1102 is implemented by one or more physical network components, such as, but without limitation, routers, switches, network interface cards (NICs), and other network devices. The network 1102 is any type of network for enabling communications with remote computing devices, such as, but not limited to, a local area network (LAN), a subnet, a wide area network (WAN), a wireless (Wi-Fi) network, or any other type of network. In this example, the network 1102 is a WAN, such as the Internet. However, in other examples, the network 1102 is a local or private LAN.

The temperature-controlled receiving tunnel 200 can send data to one or more other devices via the network 1102 and/or receive data from one or more other devices via the network, such as, but not limited to, a user device 1104, a cloud server 1106 and/or a set of sensor devices 314. A user device 1104 represent any device executing computer-executable instructions. The user device 1104 can be implemented as a mobile computing device, such as, but not limited to, a wearable computing device, a mobile telephone, laptop, tablet, computing pad, netbook, gaming device, and/or any other portable device. The user device 1104 includes at least one processor and a memory. The user device 1104 can also include a user interface component.

The cloud server 1106 is a logical server providing services to the temperature-controlled receiving tunnel 200 or other clients, such as, but not limited to, the user device 1104. The cloud server 1106 is hosted and/or delivered via the network 1102. In some non-limiting examples, the cloud server 1106 is associated with one or more physical servers in one or more data centers. In other examples, the cloud server 1106 is associated with a distributed network of servers.

In some examples, the receiving tunnel system communicates with the cloud server 1106 to obtain trailer location data, temperature data, weather data, inventory data, etc. The trailer system uses the data to control trailer cooling, etc.

The set of sensor devices 314 in this example includes one or more sensor devices associated with the temperature-controlled receiving tunnel 200. In other examples, the set of sensor devices 314 can also include one or more sensor devices inside the interior compartment of the temperature-controlled receiving tunnel 200. The set of sensor devices 314 can also include one or more sensor devices associated with the door of the temperature-controlled receiving tunnel 200, the pallet loader and/or the collapsible docking device. In an example scenario, the sensors are located on the top and sides around the loading door leading into the interior of the receiving tunnel. The sensors scan multiple sides of the items brought in through the door.

In some examples, the set of sensor devices 314 generates sensor data associated with items, such as a set of pallets 1110 moved from the storage area 1112 of the delivery truck 114 and placed inside the temperature-controlled receiving tunnel 200. The set of pallets 1110 in this example are moved manually by a driver 1114 or other personnel. In other examples, the pallet(s) are moved by an autonomous pallet loader (pallet jack).

Figure 12:
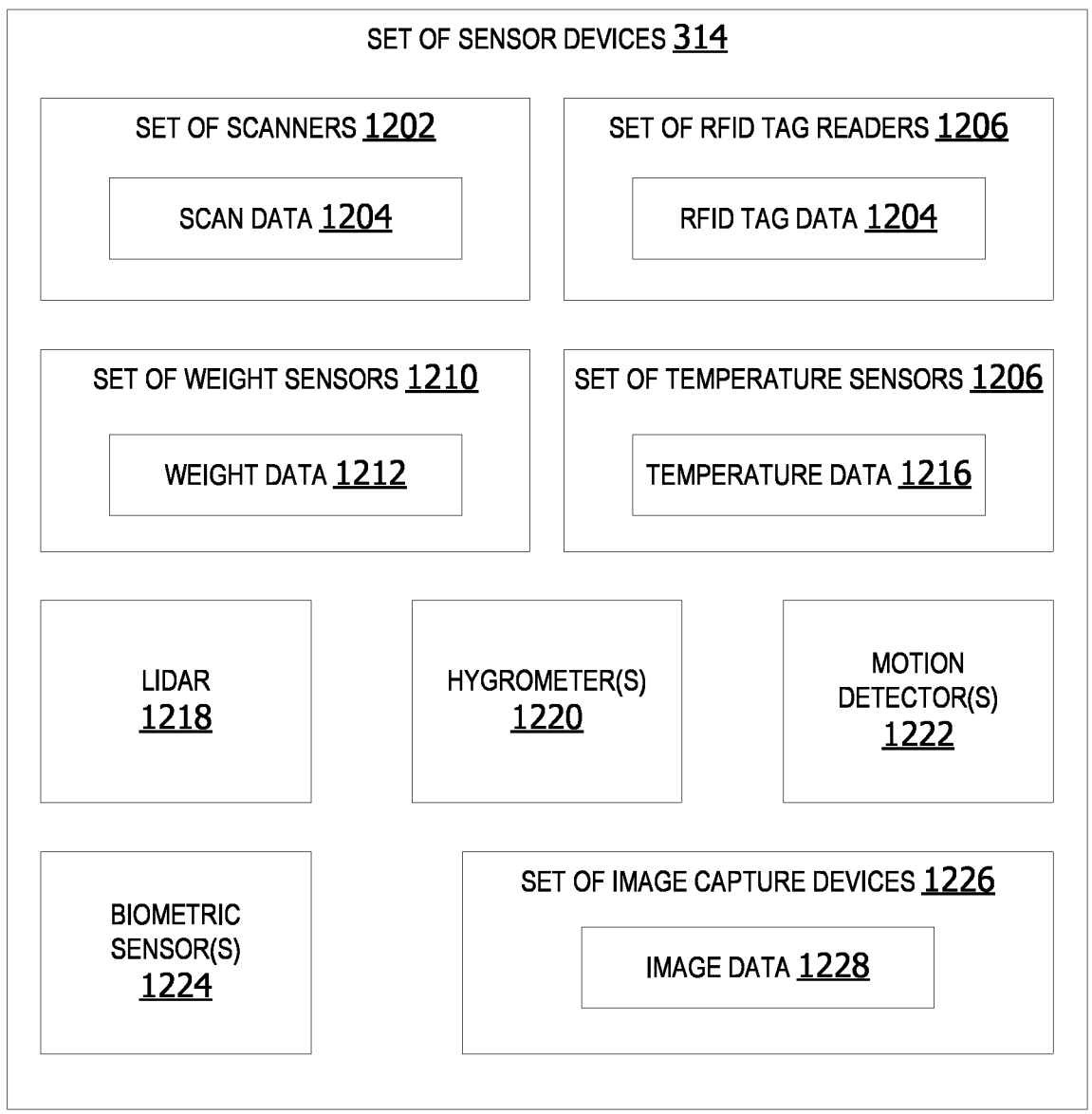
FIG. 12 is an exemplary block diagram illustrating a set of sensor devices associated with a temperature-controlled receiving tunnel.

FIG. 12 is an exemplary block diagram illustrating a set of sensor devices 314 associated with a temperature-controlled receiving tunnel. The set of sensor devices 314 can include a set of one or more scanners 1202 generating scan data 1204 associated with items in the receiving tunnel. The set of scanners can include barcode scanners, universal product code (UPC) readers, matrix barcode readers, or any other type of scanner.

The set of sensor devices optionally includes a set of radio frequency identification (RFID) tag readers 1206. The RFID tag readers generate RFID tag data 1208 associated with one or more RFID tags on one or more of the items in the receiving tunnel.

The set of sensor devices can include a set of weight sensors 1210. The set of weight sensors 1210 generate weight data 1212 associated with one or more items inside the receiving tunnel. In one example, the weight data is used to identify items in the receiving tunnel. The weight tunnel can also be used to generate a load map for pallets/items in the receiving tunnel. The receiving tunnel system weighs the pallets to balance the weight of the load in the receiving tunnel.

A set of temperature sensors 1214 includes one or more temperature sensor devices. The set of temperature sensors 1214 generate temperature data associated with the interior temperature of the receiving tunnel and/or the ambient (exterior) temperature outside the receiving tunnel.

The set of sensor devices 314 can optionally also include LIDAR 1218. LIDAR 1218 can be used during docking procedures to assist the driver of a delivery truck with connecting to the receiving tunnel. The LIDAR 1218 data can also be used to generate instructions to assist the driver with connecting to the receiving tunnel.

One or more hygrometer(s) 1220 can be included to generate temperature data associated with the humidity inside the receiving tunnel and/or the humidity outside the receiving tunnel.

Motion detector(s) 1222 in some examples are included on the receiving tunnel to assist with docking procedures and/or generating instructions to assist the driver with connecting to the receiving tunnel.

The set of sensor devices 314 in other examples can include one or more biometric sensor(s) 1224. In some examples, one or more locks on one or more doors on the receiving tunnel include a biometric sensor for unlocking the door.

The set of sensor devices 314 in other examples includes a set of image capture devices 1226, such as camera(s) and/or infrared sensors. The image capture devices 1226 generate image data 1228 associated with items placed into the receiving tunnel, a delivery truck attempting to dock with the receiving tunnel and/or a driver or pallet jack moving items/pallets into or out of the receiving tunnel.

Figure 13:
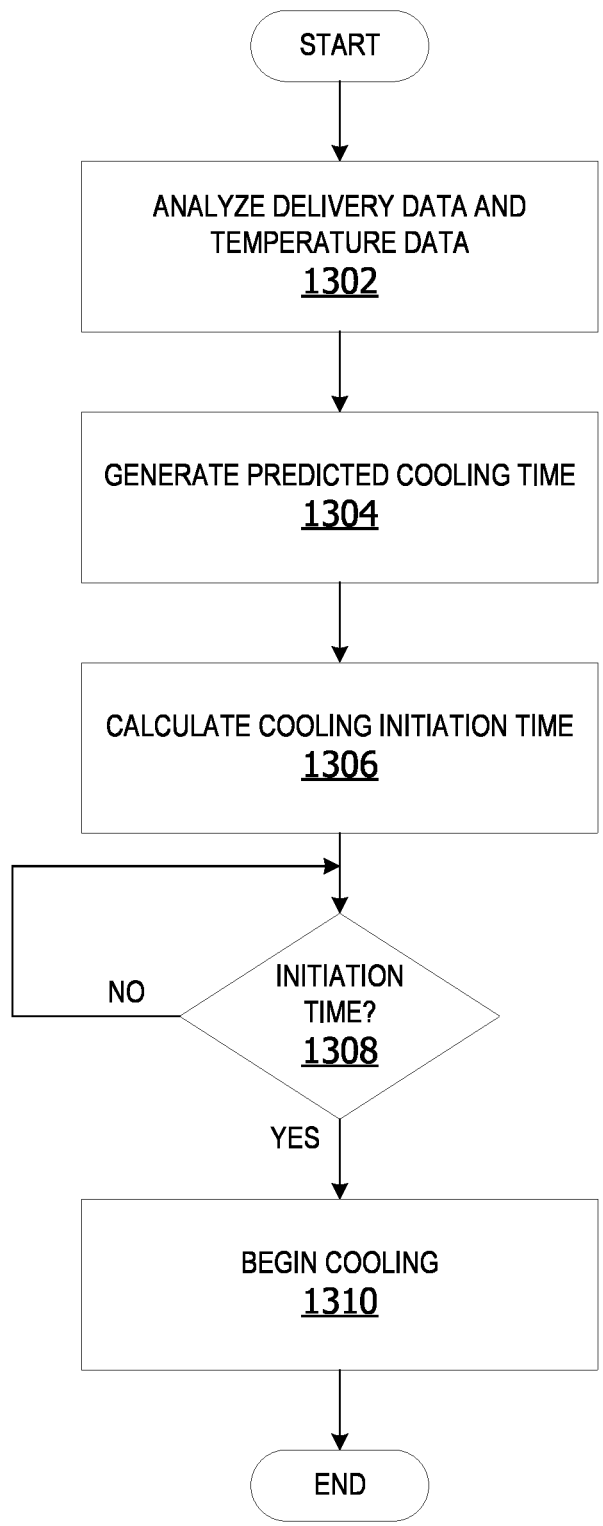
FIG. 13 is an exemplary flow chart illustrating operation of the control device to manage cooling of temperature-controlled zones.

FIG. 13 is an exemplary flow chart illustrating operation of the control device to manage cooling of temperature-controlled zones. The process in FIG. 13 is implemented by a temperature manager component executing on a control device associated with a receiving tunnel, such as, but not limited to, the control device 324 in FIG. 3.

The process begins by analyzing delivery data and temperature data at 1302. The temperature manager component generates a predicted cooling time at 1304. The temperature manager component calculates a cooling initiation time at 1306. The temperature manager component determines whether the cooling initiation time is reached at 1308. If yes, the temperature manager component begins cooling the selected zone at 1310. The process terminates thereafter.

While the operations illustrated in FIG. 13 are performed by a computing device, aspects of the disclosure contemplate performance of the operations by other entities. In a non-limiting example, a cloud service performs one or more of the operations.

Figure 14:
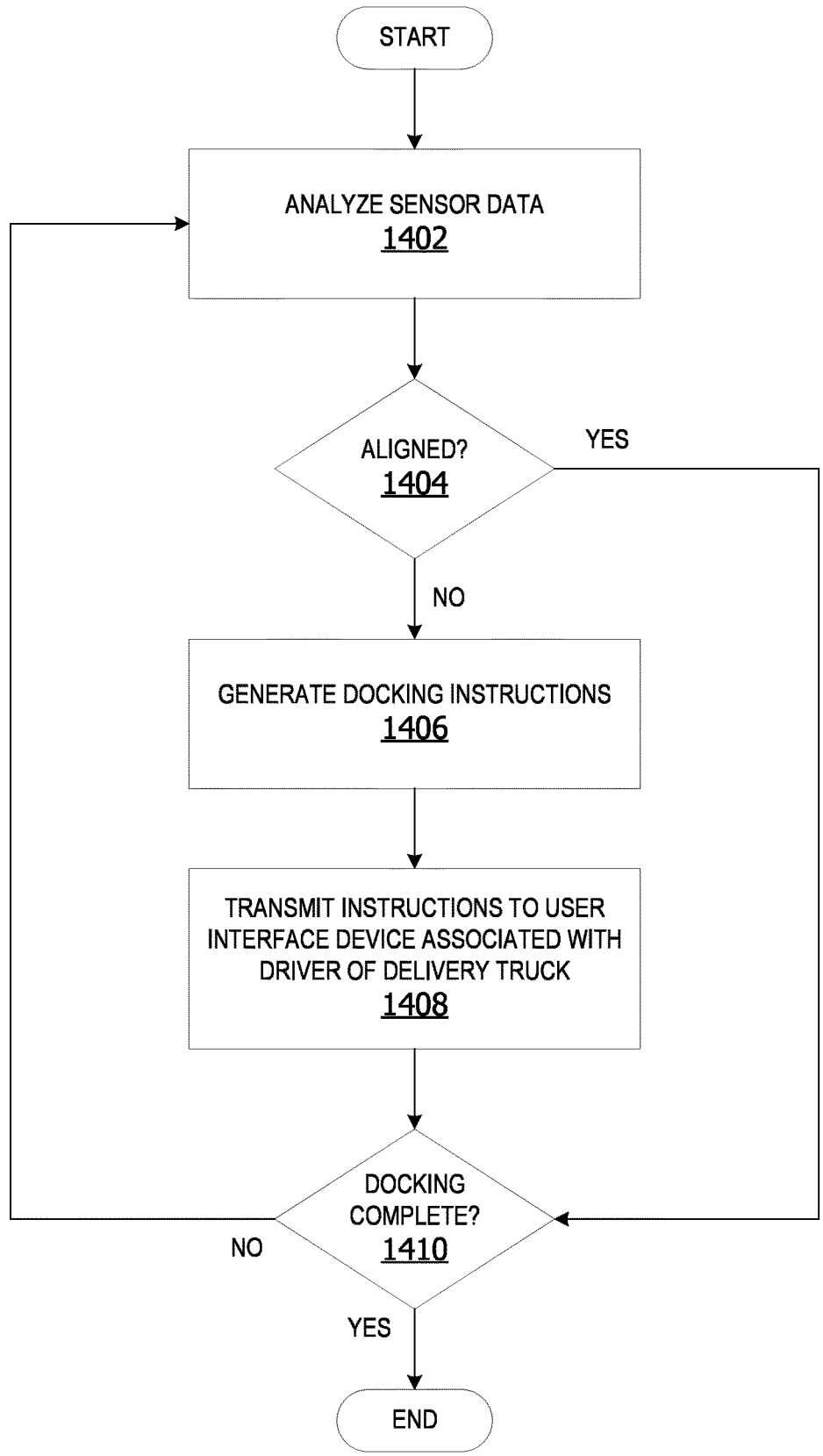
FIG. 14 is an exemplary flow chart illustrating operation of the computing device to generate docking instructions to assist a driver with docking to the receiving tunnel.

FIG. 14 is an exemplary flow chart illustrating operation of the computing device to generate docking instructions to assist a driver with docking to the receiving tunnel. The process in FIG. 13 is implemented by a guidance system executing on a control device associated with a receiving tunnel, such as, but not limited to, the control device 324 in FIG. 3.

The process begins by analyzing sensor data at 1402. The guidance system determines if the delivery truck is aligned with the receiving tunnel at 1404. If no, the guidance system generates docking instructions at 1406. The guidance system transmits instructions to the user interface device associated with the driver of the delivery truck at 1408. The guidance system determines if docking is complete at 1410. If yes, the process terminates thereafter.

Additional Examples

In some examples, a receiving "reefer" tunnel is provided which has dual ends permitting passthrough access from a delivery truck to the interior of the receiving tunnel through to the interior of the receiving facility. In other words, the receiving tunnel acts as a receiving dock during the receiving facility's open (working) hours. The receiving tunnel can also act as an overflow area for temporary storage of items during open hours. This provides an additional staging area or storage for items for early (unexpected) deliveries, late deliveries, deliveries while the receiving facility is short-staffed, during power-outage, when the receiving facility storage area is at capacity, after-hours, or any other time a temporary or additional storage is required. The receiving tunnel can also be used to improve DC efficiency and increase storage capacity at a DC or other storage facility.

The receiving tunnel permits delivery of products without intervention/assistance of store personnel. A delivery truck driver can back-up to the receiving tunnel to connect to it. The receiving tunnel has parking/docking guidance system for driver assistance that measures the distance between the backing trailer of the delivery truck and the docking device for the receiving tunnel. The system communicates to the driver and provides instructional help to make it easier to back the delivery truck into the dock.

In some non-limiting examples, the driver of the delivery truck only raises his/her trailer door and initiates the unload procedure. The receiving tunnel autonomously does the rest with an onboard autonomous pallet jack or pallet mover. The receiving tunnel downloads daily delivery schedules to anticipate refrigeration start and stop times.

In other examples, the system utilizes GPS to locate delivery trucks/loads and calculates delivery times to anticipate refrigeration start and stop times. The system updates perpetual inventory information and finalizes deliveries by using cameras, scanners, and sensors to identify invoice data on each pallet moved into the receiving tunnel. The receiving tunnel turns on refrigeration/freezer zones based on anticipated delivery information and GPS data transmitted by the delivery truck. Sensor devices read barcodes on pallets/delivered items using a scanner, camera, or other sensors to determine which pallets go into which zones inside the receiving tunnel.

In another example, the system analyzes truck delivery data and inventory data to determine whether a pallet is for a store/receiving facility at the receiving truck's location or for a facility at another location (different store). The system determines which temperature zone a pallet/item should be assigned based on cold-chain compliance requirements for the item(s). The system understands which items are on each pallet, pulls inventory and other item metrics to determine which pallets have the most need to be stocked into the receiving facility first and/or arranges pallets with the highest priority closest to the receiving facility (store) receiving door to be unloaded first.

In an example scenario, as pallets are taken off a delivery truck, the receiving trailer system scans pallets, pulls invoice data and identifies what is on each pallet. The artificial intelligence (machine learning) checks store inventory to determine which items are out of stock or low in stock. The system places those items which are low in inventory or out (highest priority to be restocked) in a location or zone which is closest to the door adjacent to the receiving facility door to be pulled out of the receiving tunnel first and restocked first.

In yet another example, a driverless delivery truck communicates with the receiving tunnel to automatically dock with the loading-end of the receiving tunnel. The driverless delivery truck systems communicate with the guidance system to align with the receiving tunnel and connect to the dock.

In other examples, an autonomous pallet loader (pallet jack) on the delivery truck automatically moves the pallets/items from the truck onto the receiving tunnel. In other examples, an autonomous pallet loader in the receiving facility assists with moving pallets/items into the receiving facility.

Alternatively, or in addition to the other examples described herein, examples include any combination of the following:

a platform;
a door associated with the first side member;
a biometric lock associated with the door;
an extension device associated with the first end of the main body, the extension device comprising a flexible extension device and a turntable configured to rotate within a one-hundred- and twenty-degree range;
wherein the extension device connects to an end of the delivery truck which is unaligned with the first end of the main body;
a guidance system, implemented on at least one processor, that analyzes sensor data associated with a location of the end of the delivery truck and outputs instructions assisting a driver of the delivery truck with connecting to the collapsible docking device;
an adjustable docking device associated with a first end of the main body, the adjustable docking device removably connecting the receiving tunnel with the delivery truck;
a set of sensor devices within the interior compartment generating sensor data associated with a set of pallets within the interior compartment;
a pneumatic lift configured to self-level at least a portion of the main body based on a height of the delivery truck attempting to dock with the receiving tunnel;
an inventory component, implemented on the at least one processor, updates perpetual inventory associated with a receiving facility;
wherein the perpetual inventory is updated to include a set of items unloaded off the delivery truck and placed within the receiving tunnel;
a set of weight sensors associated with the floor member, wherein the set of weight sensors generates weight data associated with a set of pallets within at least one zone of the interior compartment;
a map generation component, implemented on the at least one processor, generates a load map organizing placement of items within an interior compartment of the receiving tunnel for prioritized unloading based on delivery schedules, delivery inventory, and perpetual inventory of a receiving facility associated with the receiving tunnel, wherein the load map provides a placement configuration for placement of items within the interior compartment of the receiving tunnel;

a control device comprising at least one processor communicatively coupled to a memory;

a temperature manager component, implemented on the at least one processor, analyzes dynamic truck delivery data and ambient temperature data to generate a predicted cooling time and a cooling initiation time, the predicted cooling time comprising an estimated quantity of time after cooling initiation to reach a target temperature for a set of pallets within a selected zone in a set of temperature-controlled zones within a receiving tunnel;

an adjustable docking device associated with a first end of the main body, the adjustable docking device configured to connect to an end of a delivery truck associated with an unloading door of the delivery truck, the adjustable docking device connecting the receiving tunnel with the delivery truck;

an autonomous pallet loader associated with the interior compartment autonomously moves a set of pallets from a storage area within the delivery truck connected to the collapsible docking device into at least one temperature-controlled zone within the interior compartment of the main body;

docking instructions assisting a driver of the delivery truck with connecting to a docking device;

an extension device associated with the first end of the main body, the extension device comprising a flexible sleeve and a turntable configured to rotate within a one-hundred and twenty degree range, wherein the extension device connects to an end of the delivery truck which is unaligned with the first end of the main body;

a set of adjustable bulkheads associated with the top member, at least one adjustable bulkhead in the set of adjustable bulkheads drops down to create a set of temperature-controlled zones within the interior compartment;

an access component, implemented on the at least one processor, opens a door associated with a receiving facility and initiate autonomous unloading of a set of items from the receiving tunnel into the receiving facility;

a first aperture associated with the first end of the main body connecting the interior compartment of the receiving tunnel with an interior storage area of the delivery truck; and a second aperture associated with the second end of the main body connecting the interior compartment of the receiving tunnel with an interior of a receiving facility, wherein the second aperture is configured to permit transport of items from the interior compartment of the receiving tunnel into the interior of the receiving facility.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11 and FIG. 12 can be performed by other elements in FIG. 1, FIG. 2, FIG. 3, FIG. 4, FIG. 5, FIG. 6, FIG. 7, FIG. 8, FIG. 9, FIG. 10, FIG. 11 and FIG. 12, or an entity (e.g., processor 404, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11 and FIG. 12.

In some examples, the operations illustrated in FIG. 13 and FIG. 14 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of * * * , the method comprising * * * .

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing a receiving tunnel. For example, the elements illustrated in FIG. 1, FIG. 2, FIG. 3, FIG. 4, FIG. 5, FIG. 6, FIG. 7, FIG. 8, FIG. 9, FIG. 10, FIG. 11 and FIG. 12, such as when encoded to perform the operations illustrated in FIG. 13 and FIG. 14, constitute exemplary means for adjusting temperature within a set of zones and generating guidance instructions to assist a delivery truck with docking to the receiving tunnel.

Other non-limiting examples provide one or more computer storage devices having a first computer-executable instructions stored thereon for providing instructions to a delivery truck and controlling a set of cooling units associated with temperature-controlled zones within a receiving tunnel.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KM includes a continuously utilized near term source of data, but KM can be discarded depending upon the degree to which such KM has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system providing a temperature-controlled receiving tunnel, the system comprising:
    a main body comprising an interior compartment;
    a set of adjustable bulkheads configured to create a set of temperature-controlled zones within the interior compartment;
    a set of cooling devices configured to adjust an internal temperature of the set of temperature-controlled zones within the interior compartment; and
    a control device that analyzes dynamic truck delivery data and ambient temperature data to generate a predicted cooling time and a cooling initiation time, the predicted cooling time comprising an estimated quantity of time after the cooling initiation time to reach a target temperature within a selected zone in the set of temperature-controlled zones.

2. The system of claim 1, further comprising:
a first door associated with a first end of the main body;
a docking device associated with the first end of the main body, the docking device configured to connect to an end of a delivery truck; and
an autonomous pallet loader that autonomously moves a set of pallets from the delivery truck into the selected zone within the interior compartment.

3. The system of claim 1, wherein the docking device is adjustable, and wherein the control device analyzes sensor data associated with a location of the delivery truck and outputs instructions to assist connection between the delivery truck and the docking device.

4. The system of claim 1, further comprising:
a flexible extension device including a turntable configured to rotate, wherein the flexible extension device enables connection between an end of a delivery truck and the first end of the main body.

5. The system of claim 1, wherein the control device controls the set of cooling devices to adjust the internal temperature of each temperature-controlled zone within the set of temperature-controlled zones.

6. The system of claim 1, further comprising:
a pneumatic lift associated with the main body, the pneumatic lift configured to adjust a height of the main body to self-level based on a height of a delivery truck.

7. The system of claim 1, wherein the dynamic truck delivery data includes at least one of a current location of a delivery truck, a delivery schedule for the delivery truck, and inventory of the delivery truck.

8. The system of claim 1, wherein the control device generates the target temperature for the selected zone based on items identified in the dynamic truck delivery data.

9. The system of claim 8, wherein the control device automatically controls the set of cooling devices to achieve the target temperature at an expected delivery arrival time based on the predicted cooling time and cooling initiation time.

10. An apparatus comprising:
a temperature-controlled compartment, including:
a cooling device configured to adjust an internal temperature within the temperature-controlled compartment;
a control device coupled to the cooling device, the control device configured to obtain dynamic truck delivery data, determine a target temperature for the temperature-controlled tunnel based on the dynamic truck delivery data, generate a predicted cooling time to reach the target temperature based on ambient temperature relative to the temperature-controlled compartment, and control the cooling device to automatically reach the target temperature at an arrival time of a delivery truck associated with the dynamic truck delivery data.

11. The apparatus of claim 10, further comprising:
a set of adjustable bulkheads configured to create a set of individual zones within the temperature-controlled compartment, each individual zone in the set of individual zones being individually temperature-controlled by the control device.

12. The apparatus of claim 10, further comprising:
a docking device associated with an end of the temperature-controlled compartment, the docking device configured to connect to an end of the delivery truck.

13. The apparatus of claim 10, further comprising:
a pallet loader implemented within the temperature-controlled compartment, the pallet loader configured to autonomously move items from the delivery truck into the temperature-controlled compartment.

14. The apparatus of claim 10, further comprising:
a map generation component, implemented on the control device, that generates a load map for placement of items within the temperature-controlled compartment based on at least one of delivery schedules, delivery inventory, and cold-chain compliance associated with delivery items.

15. The apparatus of claim 10, further comprising:
an inventory component, implemented on the control device, that updates perpetual inventory associated with a receiving facility corresponding to the temperature-controlled compartment as items come into the temperature-controlled compartment.

16. The apparatus of claim 15, further comprising:
an access component, implemented on the control device, that controls access from the temperature-controlled compartment to the receiving facility and initiates autonomous unloading of the items from the temperature-controlled compartment into the receiving facility.

17. A temperature-controlled tunnel comprising:
an interior compartment;
a set of adjustable bulkheads configured to create a set of zones within the interior compartment;
a set of cooling devices implemented within the interior compartment; and
a control device that controls the set of cooling devices to individually adjust an internal temperature of each zone in the set of zones.

18. The temperature-controlled tunnel of claim 17, further comprising:
an aperture connecting the interior compartment with an interior of a receiving facility to permit transport of items from the interior compartment into the interior of the receiving facility.

19. The temperature-controlled tunnel of claim 17, further comprising:
a pallet loader associated with the interior compartment that autonomously moves a pallet from a delivery truck into a zone within the interior compartment.

20. The temperature-controlled tunnel of claim 19, further comprising:
a collapsible extension device configured to connect to an end of a delivery truck that is unaligned with the interior compartment to facilitate the transfer of the pallet from the delivery truck to the pallet loader within the interior compartment.

* * * * *